Dec. 3, 1963 C. E. LINKOUS 3,113,230
ROTOR FOR USE IN A SYNCHRONOUS INDUCTION MOTOR
Filed Oct. 17, 1960
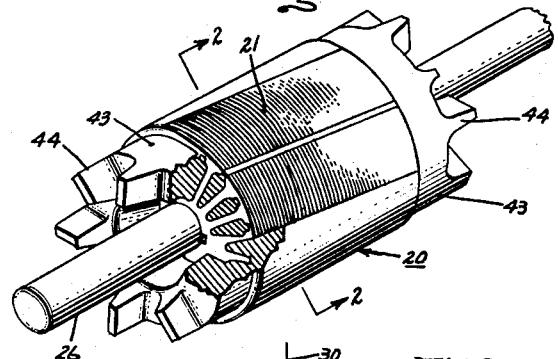
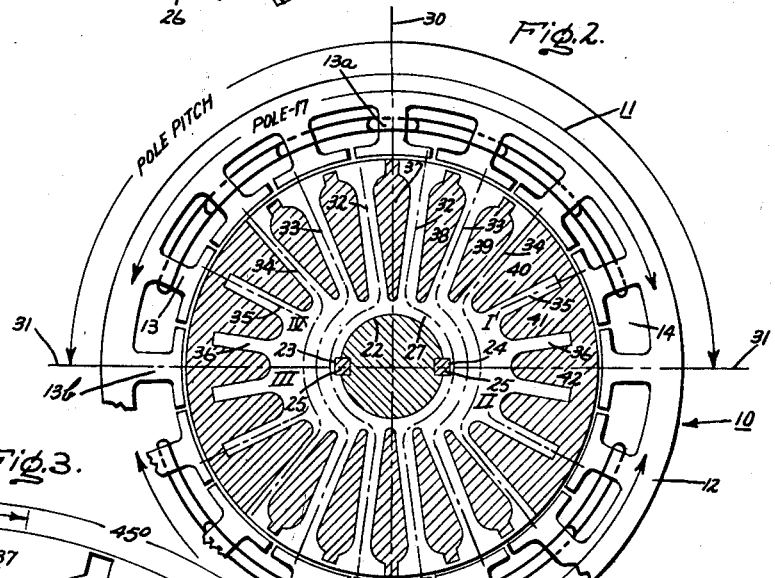
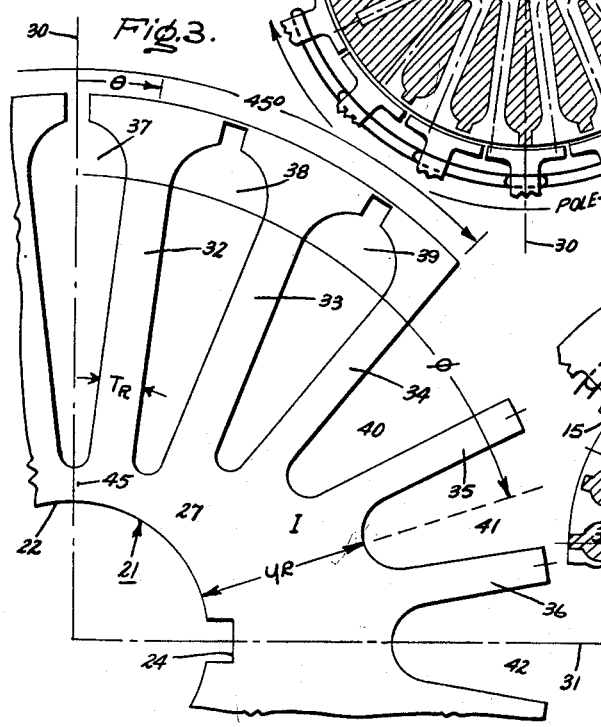
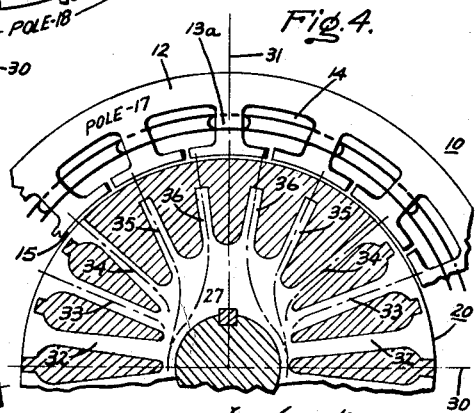
Inventor:
Clovis E. Linkous,
by John M. Stoudt
Attorney.

United States Patent Office 3,113,230
Patented Dec. 3, 1963

3,113,230
ROTOR FOR USE IN A SYNCHRONOUS
INDUCTION MOTOR
Clovis E. Linkous, Fort Wayne, Ind., assignor to General
Electric Company, a corporation of New York
Filed Oct. 17, 1960, Ser. No. 62,925
12 Claims. (Cl. 310—162)

This invention relates generally to synchronous induction motors, and more specifically, to an improved rotor for use in a synchronous induction motor, which improves the operating characteristics of the motor.

A synchronous induction motor, as such, is in effect a reluctance motor in which the rotor accelerates to full speed on the well-known induction principle. Prior to the present invention, reluctance motors were generally equipped with rotors having a plurality of segments separated by so-called radial dividing slots to control the flux path of the rotor and squirrel-cage type windings. The motor disclosed in the Morrill et al. Patent No. 1,915,069 is typical of this construction. Although these motors are generally characterized by low efficiencies, they operate at an exact speed, the synchronous speed. Thus, they are advantageously employed in situations which require the motor to run in synchronism with other pieces of equipment; e.g., textile apparatus where one machine must maintain a particular angular rotational relationship with respect to another component part of the apparatus. However, due to the continuing change in performance requirements of these pieces of equipment, the operating characteristics of the synchronous induction motor; e.g., pull-in torque and pull-out torque, have now become critical. For example, in many instances, the units which already house these motors have prescribed space available for the motors, so that synchronous motors of the same size; i.e., having the same external measurements, must drive larger inertia loads. Consequently, it is extremely desirable that the operating characteristics of the motors now in use be improved without a corresponding increase in the over-all motor dimensions. Moreover, the change should be accomplished with a minimum replacement of inexpensive parts and installation costs.

In addition, many of these motors are employed in enclosed or confined places where it is difficult to dissipate the heat generated by the motor during its operation. It is therefore essential that the improved motor performance be obtained without producing a significant rise in heat losses which, in turn, will adversely affect the heat sensitive parts of the motor; e.g., wire insulation and bearing life.

Accordingly, it is an object of the present invention to provide an improved, yet simply constructed, rotor assembly for use in a synchronous motor.

It is a further object of the invention to provide an improved synchronous induction motor having improved operating characteristics as compared with corresponding reluctance motors of the same rating and over-all size in common usage today.

It is another object of this invention to provide an improved low cost rotor assembly, particularly suitable for use with a standard synchronous induction motor stator, which will improve the pull-in torque and pull-out torque of the motor without necessitating a corresponding increase in the over-all motor dimensions.

It is still a further object of the present invention to provide a rotor lamination for use in a synchronous induction motor assembly which is inexpensive to produce.

In one form thereof, I provide an improved rotor assembly for use in a synchronous induction motor in which a magnetic rotor core, which is secured to a shaft, is formed with a plurality of teeth defining axially extending winding slots therebetween and with a yoke section joining the teeth together radially inward of the core. A non-magnetic electrically conducting material is disposed in the winding slots and interconnected at each end of the rotor core to form a squirrel-cage winding. The core is formed symmetrical with respect to the direct and quadrature axes, with the yoke section progressively increasing in radial depth from a minimum near the direct axis to a maximum at the quadrature axis. In addition, the teeth adjacent the direct axis are greater in width than the corresponding part of the teeth located near the quadrature axis to create a minimum reluctance for the direct axis flux and at the same time a maximum reluctance for the quadrature axis flux.

The subject matter which I regard as my invention is particularly pointed out and distinctly claimed in the concluding portion of this specification.

My invention, itself, however, both as to the organization and operation, together with further objects and advantages thereof, may best be understood by reference to the following description taken in connection with the accompanying drawing.

In the drawing:

FIG. 1 is a view in perspective, partially broken away, of a rotor assembly embodying the present invention in one form thereof;

FIG. 2 is a cross sectional view of a synchronous induction motor taken in a plane perpendicular to the axis of shaft rotation, the view including a schematic representation of a portion of the stator and a cross sectional view of the rotor assembly of FIG. 1, taken along lines 2—2 in FIG. 1, to show the direct axis flux path and novel rotor construction in more detail;

FIG. 3 is an enlarged view of a portion of a single rotor lamination employed in the construction of the rotor assembly of FIG. 1; and FIG. 4 is a fragmentary view, partially in cross section, of the synchronous induction motor of FIG. 2 with the rotor assembly in a different position to show the quadrature axis flux path.

Referring now to the drawing, for purposes of illustration, I have shown the preferred embodiment of my invention incorporated in a two hole synchronous induction motor, generally indicated by numeral 10 in FIGS. 2 and 4. The motor includes a stator 11 of the type conventionally used in a standard single phase induction motor, the stator being formed with a yoke portion 12 and a plurality of equally spaced teeth 13, which define winding slots 14 and a rotor receiving bore 15. A main or running winding 16, is arranged in slots 14 to form two diametrically opposed poles, designated at 17 and 18, in the usual way, with each having a pole pitch of 180 electrical degrees. Winding 16 is suitably connected to an external source of power (not shown). For induction starting of motor 10, a starting winding (not illustrated) may be arranged in the stator 11 in the well-known manner to provide a phase displacement between the currents flowing through the respective main and starting windings. After the motor has been started, the starting winding may, of course, be de-energized and the motor may operate with only the running winding 16 energized, if so desired.

The preferred embodiment of my improved rotor assembly, which may be advantageously employed in motor 10, is illustrated in FIGS. 1, 2, and 4 and identified generally by reference numeral 20. The rotor assembly consists of a predetermined number of substantially identical laminations 21, composed of magnetic material such as iron, in superposed and preferably skewed relation to form a magnetic core. Each lamination is furnished with a central shaft accommodating aperture 22 and two diametrically opposed notches 23 and 24, which may be used for skewing the rotor laminations during the assembly of the core and for receiving a key 25 to secure the core to rotate with a rotor shaft 26. The rotor shaft may be made of magnetic or non-magnetic material, such as a stainless steel; however, if shaft 26 is composed of a magnetic material, then a non-magnetic sleeve (e.g. brass, not shown) is fitted between laminations 21 and shaft 26 to isolate one magnetically from the other.

As illustrated by FIGS. 2–4 inclusive, each rotor lamination is formed with a plurality of circumferentially spaced teeth which define winding slots therebetween, and a yoke section 27 which joins the teeth together to provide a magnetic circuit, the construction affording a novel arrangement of high and low magnetic reluctance paths between the rotor core and the poles of stator 11. This is desirable for several reasons. For instance, the pull-out torque of a synchronous induction motor; i.e., the maximum constant friction torque with which the motor can maintain synchronism, is a function of the direct axis reactance and the quadrature axis reactance of the magnetic circuit. To obtain maximum pull-out torque, the direct axis reactance must be kept at a maximum with the quadrature axis reactance provided at a minimum. Since reactance is proportional to flux, which may be reduced by increasing the reactance in the rotor flux path, maximum pull-out torque therefore requires a minimum of direct axis reluctance and a maximum of quadrature axis reluctance. In addition, this inverse relationship between the direct axis reluctance and the quadrature axis reluctance keeps magnetizing losses at a minimum, consequently resulting in lower full load losses.

The rotor of the present invention, in order to create very little rotor reluctance for the flux of the direct axis 30 and a maximum rotor reluctance for the flux of the quadrature axis 31, has, in effect, the teeth and yoke section 27 approximately proportioned according to the direct axis flux which each carries so that when the flux enters the direct axis 30 (FIG. 2) all magnetic regions of the rotor core, in the magnetic rotor circuit between the stator poles, have a substantially uniform flux density, just under the desired saturation level of the rotor.

More specifically, in the illustrated embodiment, each rotor lamination 21 is formed symmetrical about both the direct axis 30 and the quadrature axis 31 which are 90 electrical degrees apart, and in view of the fact that the illustrated motor 10 is designed for two pole operation, axes 30 and 31 define a total of four segments, I–IV inclusive, of 90 electrical degrees each. Every segment is provided with a plurality of teeth 32, 33, 34, 35 and 36 respectively which preferably decrease in cross section area, from a maximum tooth width at tooth 32, positioned adjacent the direct axis 30, to a minimum tooth width at tooth 36 disposed next to the quadrature axis 31. As shown, each tooth is substantially uniform in width for the greater part of its radial length. In addition, teeth 32–34 inclusive extend to the peripheral surface of the lamination, the faces of each tooth forming a portion of the circumferential surface of the rotor core. It is preferable that the combined arcuate length formed by teeth 32, 33, and 34 of all the segments be in the neighborhood of 50% of the total rotor circumference. These same teeth form between them a plurality of winding slots identified by numerals 37, 38, and 39 respectively. Teeth 35 and 36, disposed adjacent the quadrature axis 31, are preferably of reduced length for reasons to be explained hereinafter, and along with teeth 34, provide winding slots 40, 41 and 42. Referring now to rotor yoke section 27, which joins teeth 32–36 inclusive together radially inward from the winding slots, in the preferred embodiment, section 27 gradually increases in radial depth from a minimum value at the direct axis 30 to a maximum at the quadrature axis 31.

With laminations 21 assembled in juxtaposition to form a laminated rotor stack, all of the axially aligned winding slots, including the area radially beyond the faces of teeth 35 and 36, may be filled with any suitable non-magnetic electrically conducting material, such as cast aluminum, which preferably is interconnected and joined at each end of the core by an end ring 43 (FIG. 1) to form a substantially cylindrical core with a squirrel-cage winding. The rings 43 may be made of the same material as that filling the winding slots, and a plurality of fan blades 44 may be die cast integrally with each end ring 43 for heat dissipating purposes.

The significance of the rotor teeth and yoke section construction will become more apparent and better appreciated from the following explanation. Under ideal stator flux distribution conditions, the flux density of each of stator poles 17 and 18 varies in a sinusoidal fashion from a peak stator flux density at the center of each pole (e.g. tooth 13a), to a minimum value at the stator pole extremities, teeth 13b. Since the flux carrying ability of the rotor teeth and yoke section 27 is somewhat lower than but proportional to the flux capacity of the respective stator teeth 13 and yoke 12 for any given electrical angle as measured from the center of the poles, the flux transmitted to the rotor will also vary in a sinusoidal manner.

The condition of highest flux and lowest reluctance for rotor assembly 20 will be that shown by FIG. 2, with the direct axis 30 positioned in alignment with the center of each of poles 17 and 18; i.e., with tooth 13a. To take advantage of the flux pattern transmitted to the rotor and to achieve a substantially low reluctance path for the rotor teeth, the combined cross section area of all the rotor teeth should be less than the total cross section area of all the stator teeth 13, the width of any given rotor tooth ($T_R$) being equal to a constant (K) times the cosine of the electrical angle ($\theta$) measured between direct axis 30 and the center of the tooth face of $T_R$. This may be illustrated by the following equation where K equals .8 times the total width of all the stator teeth/the total number of rotor teeth: $T_R = K$ cosine $\theta$. For example, assuming that stator 11 is constructed with sixteen identical teeth, each being .13 inch wide and the rotor assembly has a total of twenty rotor teeth, then referring in particular to FIG. 3, with the center of tooth 32 located nine electrical degrees from the direct axis 30 of the air gap flux (FIG. 3), ideally the width ($Y_R$) of tooth 32 should be 0.81 inch. In the same way, the width of teeth 33–36 inclusive should also vary sinusoidally with angle $\theta$. Since it is an inherent characteristic of a line of flux that it will travel the path of least reluctance, when the flux enters the direct axis 30 of the air gap, (the flux path being indicated by the broken lines in FIG. 2), all rotor teeth will be at approximately the same flux density and an unusually low reluctance flux path is provided by the rotor teeth for the direct axis flux.

With specific reference to the path of least reluctance for the direct axis air gap flux through the rotor yoke section 27, for optimum results the maximum radial depth of section 27 in each rotor segment should be less than the maximum radial dimension of stator yoke section 12, and at any given point the radial depth of rotor yoke section 27 ($Y_R$) should be proportional to a constant (C) times the sine of angle $\phi$, where (C) is equal to .8 times the stator yoke width and $\phi$ is the electrical angle between the direct axis 30 and the center of a winding slot taken at the peripheral surface of the rotor core:

$$Y_R = (C) \text{ sine } \phi$$

Thus, assuming stator yoke section 12 has a radial width of 0.37 inch and the center of rotor slot 41 is 72 electrical degrees from the direct axis, ideally, rotor yoke section ($Y_R$) should be 0.282 inch. Accordingly, the rotor yoke section provides a flux path proportional to the amount of flux which will travel through the rotor teeth from pole to pole and the rotor yoke section 27 will have a substantially constant flux density, thereby providing a maximum flux path or minimum reluctance for the direct axis air gap flux.

Referring now to FIG. 4, it will be seen that the rotor assembly 20 not only presents very little reluctance for the direct axis flux, but in addition, it provides a maximum reluctance (minimum flux path) for the quadrature axis flux. For example, with the quadrature axis 31 in alignment with the center of stator pole 17, the rotor teeth 36 of minimum width are positioned adjacent the center of the stator pole 17 which has the greatest flux density. In addition, with teeth 35 and 36 of reduced length, the magnetic gap between the respective tooth face and the peripheral surface of the stator teeth is increased which, in turn, further increases the reluctance path in those teeth. Also, with the rotor yoke section 27 progressively decreasing from the quadrature axis 31 toward the direct axis 30, the magnetic path between poles 17 and 18 will also be restricted in the vicinity of the direct axis 30, further increasing the reluctance of the quadrature axis 31.

With the foregoing rotor teeth and yoke arrangement, not only is a highly desirable reluctance path established for the direct and quadrature axes, but in addition the rotor winding slots provide a large area for the rotor winding, and the pull-in torque of the motor; i.e., maximum constant torque under which the motor pulls its connected inertia load into synchronism at rated voltage, is greatly enhanced. For example, among other things, pull-in torque of a motor varies inversely with respect to the rotor resistance and to the rotor inertia. With the present invention, the large rotor winding slots produce a relatively low resistance rotor core and a relatively low inertia rotor due to the fact that the magnetic circuit of the rotor core contains a minimum of the high mass density magnetic material and an increased quantity of lower mass density non-magnetic material, such as cast aluminum, which fills the enlarged area provided by the rotor winding slots. Furthermore, the motor efficiency is not adversely affected by the large area of the rotor winding slots.

While my improved synchronous rotor assembly construction has been shown as embodied in a two pole synchronous induction motor, my invention is not limited to two pole motors and the principles thereof are equally applicable to motors having more than two poles. Likewise, some deviation from the relationship of the rotor teeth and yoke section described above is permissible within the scope of my invention and still retain the benefits thereof. For instance, although ideally yoke section 27 at the direct axis 30, directly below winding slot 37, should be of zero radial depth; i.e. since φ would equal zero, a saturable bridge 45 (FIG. 3) may be provided between adjacent rotor segments at the direct axis 30, to permit the manufacture of the rotor lamination 21 in one piece, without materially affecting the operating characteristics of motor 10. In the alternative, the bridge may be provided between teeth 32 at the periphery of the core to connect the adjacent segments together, thereby closing winding slots 37 at the periphery. It will also be seen that in the rotor embodiment shown by the drawing, the notches 24 which accommodate keys 25 for securing the rotor core to shaft 26, are arranged at the quadrature axis 31, adjacent aperture 22. Since yoke section 27 has its greatest radial dimension in that area, notches 24 will not materially affect the direct axis flux path.

For fractional horsepower motors having small diameter rotor cores; e.g., two inches, it is impractical for manufacturing reasons to adhere precisely to the ideal rotor core construction previously outlined. However, I have found that the rotor teeth adjacent the direct axis 30 must be larger in width than the teeth located adjacent the quadrature axis and the rotor yoke section should gradually increase in radial depth from the direct axis 30 to the quadrature 31 in order to obtain the best advantages of my invention. While motor 10 of the preferred embodiment incorporates a rotor assembly 20 having a total of twenty winding teeth and a stator 11 including sixteen winding teeth, or a motor tooth combination of two teeth per pole more for the rotor than for the stator, it is desirable to utilize a rotor-stator tooth ratio of between .75 and 1.5. This relationship minimizes the motor noise level and the reluctance locking torque during starting conditions.

The following example is given in order to illustrate more clearly how the invention, as described above, has been carried forth in actual practice. The motor was of the fractional horsepower, single phase two pole synchronous induction type in which stator 11 was conventionally built with 1⅜ inch substantially cylindrical stack formed of common iron laminations. The stator was provided with a peripheral diameter of three inches and sixteen equally spaced teeth 13, each being 0.13 inch wide, which defined sixteen winding slots 14 and a rotor receiving bore 15 of 1.6 inches. In addition, the yoke section 12 of stator 11 had a radial dimension of 0.37 inch, the yoke section being dimensionally uniform. A main winding was arranged in slots 14 to form two poles, as shown in FIG. 2. The maximum stator yoke flux density was 105,000 lines/square inch. Rotor assembly 20 was also constructed with a 1⅜ inch stack of common iron laminations, each having a thickness of approximately 0.025 inch and being skewed at an angle of 22.5 electrical degrees. The rotor included twenty teeth with the winding slots filled with a cast aluminum cage winding and provided the motor with a ten mil air gap. Rotor yoke section 27 progressively increased in radial depth from a minimum of 0.062 inch along the direct axis 30 at bridge 45 to a maximum of 0.278 inch adjacent the quadrature axis 31. The dimensional width of the rotor teeth varied as follows: teeth 32 and 33, 0.072 inch; teeth 34, 0.055 inch; and teeth 35 and 36, 0.050 inch. Each rotor tooth was also substantially uniform in width for the greater portion of its radial length similar in configuration to that of the illustrated embodiment.

When tested, the motor of the example given above showed superior operating characteristics with respect to any motor of a comparable type and size known to the applicant. This may be illustrated by a comparison of its performance with that of the well-known and widely used two pole single phase reluctance motor having a rotor with a single deep reluctance slot per pole constructed as disclosed in the Morrill et al. Patent 1,915,069 and identified hereinafter as the Morrill motor. This motor was tested with the same stator as that utilized in motor 10 of the example and included the same air gap and stator yoke flux density. The Morrill motor used a fabricated, laminated rotor of the same stack height (1⅜ inch) with a copper cage. The following table lists the test results for each motor:

| Operating Characteristic | Morrill Motor | Example Motor |
|---|---|---|
| Pull-In Torque, oz. in | 10.2 | 15.2 |
| Pull-Out Torque, oz. in | 10.0 | 18.3 |
| Power Loss at a load of seven oz. inch torque, watts | 47.9 | 50.4 |

From the foregoing table, it will be seen that the example motor constructed in accordance with the present invention had an increase of 49% in pull-in torque and of 79% in pull-out torque over that of the widely recognized standard Morrill motor, yet the full load loss was increased only by a nominal 5%. This performance of the example motor is even more striking in view of the fact that the rotor of the example motor utilized a winding of cast aluminum, which has approximately sixty percent the conductivity of copper, the material employed for the rotor winding of the Morrill motor.

The advantages of my invention are readily manifest from the foregoing. The operating characteristics of synchronous induction motors already in use can be greatly improved merely by the relatively inexpensive replacement of a rotor assembly constructed in accordance with the present invention without a corresponding increase in over-all motor dimensions. Further, this improved performance is obtained without producing a significant rise in heat losses which would adversely affect the temperature sensitive paths of the motor, especially important where the motor is mounted in an enclosed and relatively confined place and the heat cannot be effectively dissipated. In addition, a complete synchronous type motor incorporating my invention may be built with shorter stator and rotor stack lengths and still have at least the same rating and performance as compared with those in use today which do not include the present invention. This, in turn, permits the use of a smaller motor for any given application, extremely desirable where the available space in a unit for the motor is at a premium.

It should be apparent to those skilled in the art, while I have shown and described what at present is considered to be the preferred embodiments of my invention in accordance with the patent statutes, changes may be made in the structure disclosed without actually departing from the true spirit and scope of this invention, and I therefore intend to cover in the following claims all such equivalent variations as fall within the invention.

What I claim as new and desire to secure by Letters Patent of the United States is:

1. A synchronous induction motor comprising a stator, a rotor assembly rotatably supported relative to said stator, said assembly comprising a shaft and a magnetic core carried by said shaft, said core including a plurality of teeth forming a plurality of axially extending winding slots therebetween and a yoke section joining said teeth together radially inward of said core, said slots being substantially filled with a non-magnetic electrically conducting material and interconnected at each end of said core to form a squirrel-cage winding, the bottom of the individual slots being disposed at generally differing radial distances from the axis of rotation to form said yoke section with a generally increasing radial depth from a minimum near the direct axis to a maximum adjacent the quadrature axis to create a magnetic circuit through said yoke section having a substantially low reluctance for the direct axis flux and a substantially high reluctance for the quadrature axis flux.

2. A synchronous induction motor comprising a stator, a rotor assembly rotatably supported relative to said stator, said assembly comprising a shaft and a substantially cylindrical magnetic core carried by said shaft, said core including a plurality of axially extending winding slots forming a number of teeth therebetween and a yoke section joining said teeth together radially inward of said core, said slots being substantially filled with a non-magnetic electrically conducting material and interconnected at each end of said magnetic core to form a squirrel-cage winding, the teeth width between adjacent slot sides lying near the direct axis being greater dimensionally than the corresponding width of the teeth disposed adjacent the quadrature axis and the solid portion of the yoke section disposed adjacent the quadrature axis being of greater radial depth than the portion of the yoke disposed adjacent the direct axis to create a substantially low reluctance for direct axis flux and a substantially high reluctance for the quadrature axis flux through said magnetic core.

3. A synchronous induction motor comprising a stator, a rotor assembly rotatably supported relative to said stator, said assembly comprising a shaft and a magnetic core carried by said shaft, said core including a plurality of axially extending winding slots forming teeth therebetween and a yoke section joining said teeth together radially inward of said core, said slots being substantially filled with a non-magnetic electrically conducting material and interconnected at each end of said core to form a substantially cylindrical core with a squirrel-cage winding, said yoke section gradually increasing in radial depth from a minimum near the direct axis to a maximum adjacent the quadrature axis and the teeth adjacent the direct axis being greater in width at any given radial distance from the axis of core rotation than the teeth disposed adjacent the quadrature axis to create a magnetic circuit through said core having a minimum reluctance for the direct axis flux and a maximum reluctance for the quadrature axis flux.

4. A synchronous induction motor comprising a stator having a yoke section and a plurality of teeth defining a plurality of winding slots and a rotor receiving bore, an excitation winding arranged in said slots to form at least two poles, a rotor assembly rotatably supported relative to said stator, said assembly comprising a shaft and a magnetic core carried by said shaft, said core being symmetrical with respect to the direct axis and including a plurality of teeth forming a plurality of axially extending winding slots therebetween and a yoke section joining said rotor teeth together radially inward thereof, at least one of said winding slots being disposed adjacent the direct axis and extending radially outward to the core periphery from a location adjacent said shaft, said slots being substantially filled with a non-magnetic electrically conducting material and interconnected at each end of said magnetic core to form a substantially cylindrical core with a squirrel-cage winding, the total cross section area of said rotor teeth being less than the combined cross section area of said stator teeth with the portion of the rotor teeth between adjacent slot sides lying near the direct axis being of greater width than the corresponding portion of the rotor teeth disposed adjacent the quadrature axis, said slots and teeth creating a magnetic circuit through said rotor teeth having a substantially low reluctance for the direct axis flux and having a substantially high reluctance for the quadrature axis flux.

5. A synchronous induction motor comprising a stator having a yoke section and a plurality of teeth defining a plurality of winding slots and a rotor receiving bore, an excitation winding arranged in said slots to form at least two poles, a rotor assembly rotatably supported relative to said stator, said assembly comprising a shaft and a substantially cylindrical laminated magnetic core carried by said shaft, said core including a plurality of teeth forming a plurality of axially extending winding slots therebetween, the ratio of the total number of rotor teeth relative to the total number of stator teeth being substantially within the range 0.75 to 1.5, a yoke section joining said rotor teeth together radially inward of said core, said rotor slots being substantially filled with a non-magnetic electrically conducting material and interconnected at each end of said magnetic core to form a substantially cylindrical core with a squirrel cage winding, said rotor yoke section progressively increasing in radial depth from a minimum adjacent the direct axis to a maximum adjacent the quadrature axis with said maximum radial depth of said rotor yoke section being less than the maximum radial dimension of said stator yoke section to create a magnetic circuit through said rotor yoke section having a substantially low reluctance for the direct axis flux and having a substantially high reluctance for the quadrature axis flux.

6. A synchronous induction motor comprising a stator having a yoke section and a plurality of teeth defining a plurality of winding slots and a rotor receiving bore, an excitation winding arranged in said slots to form at least two poles, a rotor assembly rotatably supported relative to said stator, said assembly comprising a shaft and a magnetic core carried by said shaft, said core including a plurality of teeth having a total cross section area less than the combined cross section area of said stator teeth, any given portion of the rotor teeth between adjacent slot sides lying near the direct axis being greater in width than the corresponding portion of rotor teeth disposed adjacent the quadrature axis, said rotor teeth forming a plurality of axially extending winding slots therebetween, and a yoke section joining said teeth together radially inward of said core, said slots being substantially filled with a non-magnetic electrically conducting material and interconnected at each end of said magnetic core to form a substantially cylindrical core with a squirrel-cage winding, said rotor yoke section gradually increasing in radial depth from a minimum near the direct axis to a maximum adjacent the quadrature axis with said maximum radial depth of said rotor yoke section being less than the maximum radial dimension of said stator yoke section to create a magnetic circuit through said core having a minimum reluctance for the direct axis flux and a maximum reluctance for the quadrature axis flux.

7. For use in a synchronous induction motor, a rotor assembly comprising a shaft and a magnetic core having a central aperture for receiving said shaft, said core including a plurality of axially extending winding slots forming teeth therebetween and a substantially solid magnetic yoke section joining said teeth together radially inward of said core and symmetrical with respect to the direct axis, said slots being substantially filled with a non-magnetic electrical conducting material and interconnected at each end of said core to form a substantially cylindrical peripheral core surface and a squirrel-cage winding, said yoke section generally increasing radial depth as defined from the edge of the central aperture to the bottom of the respective slots from a minimum near the direct axis to a maximum adjacent the quadrature axis to render a substantially low reluctance for the direct axis flux and a substantially high reluctance for the quadrature axis flux.

8. For use in a synchronous induction motor, a rotor assembly comprising a shaft and a substantially cylindrical magnetic core carried by said shaft, said core including a plurality of teeth forming a plurality of axially extending winding slots therebetween and a yoke section joining said teeth together radially inward of said core, said slots being substantially filled with a non-magnetic electrical conducting material and interconnected at each end of said core to form a squirrel-cage winding, said yoke section progressively increasing in the radial depth from a minimum near the direct axis to a maximum at the quadrature axis, the width of each tooth being substantially uniform for the greater part of its respective radial length with the teeth width between adjacent slot sides lying near the direct axis being dimensionally greater than the corresponding width of the teeth disposed adjacent the quadrature axis, whereby said teeth and yoke section create a magnetic circuit through said core having a minimum reluctance for the direct axis flux and a maximum reluctance for the quadrature axis flux.

9. For use in a synchronous induction motor, a rotor assembly comprising a shaft and a substantially cylindrical magnetic core carried by said shaft, said core including a plurality of teeth forming a plurality of axially extending winding slots therebetween and a yoke section joining said teeth together radially inward of said core, said slots being substantially filled with a non-magnetic electrical conducting material and interconnected at each end of said core to form a squirrel-cage winding, the radial depth of said yoke section increasing substantially as the sine of the electrical angle measured between the direct axis and the center of the winding slot taken at the periphery of said core thereby rendering a reduced reluctance for the direct axis flux and an increased reluctance for the quadrature axis flux.

10. For use in a synchronous induction motor, a rotor assembly comprising a shaft, a substantially cylindrical magnetic core secured to said shaft, said core including a plurality of teeth forming a plurality of axially extending winding slots therebetween and a yoke section joining said teeth together radially inward of said core, said slots being substantially filled with a non-magnetic electrical conducting material and interconnected at each end of said core to form a squirrel-cage winding, the width of said teeth decreasing substantially as the cosine of the electrical angle measured between the direct axis and the center of said teeth taken at the periphery of said core thereby rendering a reduced reluctance for the direct axis flux and an increased reluctance for the quadrature axis flux.

11. For use in a synchronous induction motor, a rotor assembly comprising a shaft and a substantially cylindrical magnetic core carried by said shaft, said core including a plurality of teeth forming a plurality of axially extending winding slots therebetween and a yoke section joining said teeth together radially inward of said core, said slots being substantially filled with a non-magnetic electrical conducting material and interconnected at each end of said core to form a squirrel-cage winding, the radial depth of said yoke section increasing substantially as the sine of the electrical angle measured between the direct axis and the center of the winding slot taken at the peripheral surface of said core and the width of said teeth decreasing substantially as the cosine of the electrical angle measured between the direct axis and the center of said teeth taken at the periphery of said core thereby creating a minimum reluctance for the direct axis flux and a maximum reluctance for the quadrature axis flux.

12. For use in a synchronous induction motor, a rotor assembly comprising a shaft and a magnetic core carried by said shaft, said core including a plurality of axially extending winding slots forming teeth therebetween, said slots accommodating a winding, a yoke section joining said teeth together radially inward of said slots, with the radial distance from the core axis of rotation to the bottom of the individual slots generally increasing from a minimum dimension adjacent the direct axis to a maximum adjacent the quadrature axis to create a substantially low reluctance for direct axis flux and a substantially high reluctance for the quadrature axis flux through said core.

References Cited in the file of this patent

UNITED STATES PATENTS

| | | |
|---|---|---|
| 2,708,724 | Martin et al. | May 17, 1955 |
| 2,913,607 | Douglas et al. | Nov. 17, 1959 |
| 2,971,106 | Westphalen | Feb. 7, 1961 |